US012722396B2

(12) United States Patent
Usui et al.

(10) Patent No.: US 12,722,396 B2
(45) Date of Patent: Sep. 1, 2026

(54) IMAGE FORMING APPARATUS

(71) Applicant: KYOCERA Document Solutions Inc., Osaka (JP)

(72) Inventors: Masato Usui, Osaka (JP); Hiroomi Nakatsuji, Osaka (JP); Naoko Kawashima, Osaka (JP); Jun Nakano, Osaka (JP)

(73) Assignee: Kyocera Document Solutions, Inc. (JP)

( * ) Notice: Subject to any disclaimer, the term of this patent is extended or adjusted under 35 U.S.C. 154(b) by 163 days.

(21) Appl. No.: 18/602,494

(22) Filed: Mar. 12, 2024

(65) Prior Publication Data

US 2024/0308237 A1 Sep. 19, 2024

(30) Foreign Application Priority Data

Mar. 16, 2023 (JP) ................................ 2023-042332

(51) Int. Cl.
*B41J 2/21* (2006.01)
*G06K 15/02* (2006.01)

(52) U.S. Cl.
CPC ........... *B41J 2/2139* (2013.01); *B41J 2/2135* (2013.01); *B41J 2/2142* (2013.01); *B41J 2/2146* (2013.01); *G06K 15/027* (2013.01); *G06K 2215/101* (2013.01)

(58) Field of Classification Search
CPC ...... B41J 2/2139; B41J 2/2135; B41J 2/2142; B41J 2/2146; B41J 2025/008; B41J 2/16579; G06K 15/027; G06K 2215/101
See application file for complete search history.

(56) References Cited

U.S. PATENT DOCUMENTS

2012/0154477 A1* 6/2012 Yamazaki .............. B41J 2/2146 347/19
2014/0232772 A1 8/2014 Sasaki
2021/0001638 A1* 1/2021 Shibata ................ B41J 2/04508

FOREIGN PATENT DOCUMENTS

JP 2014-159139 9/2014

* cited by examiner

*Primary Examiner* — Jannelle M Lebron

(57) ABSTRACT

An ejection malfunction nozzle detecting unit prints a test pattern on a print sheet using the recording head, and detects an ejection malfunction nozzle on the basis of a density distribution of a scanned image of the test pattern. Here, a resolution of the scanned image is lower than a resolution of the test pattern printed on the print sheet using the recording head. Further, a correction processing unit (a) stores into a predetermined storage device history data that indicates the ejection malfunction nozzle for which the correction process was performed, (b) refers to the history data and detects as an additional correction nozzle a nozzle included in the history data, among nozzles corresponding to a predetermined pixel range that includes a pixel corresponding to the detected ejection malfunction nozzle, and (c) performs the correction process for the detected ejection malfunction nozzle and the additional ejection malfunction nozzle.

4 Claims, 4 Drawing Sheets

10
10b
(10b2)
10b
(10b1)
27
41
41a
28
32
31
23
22
21
26
25
24
5
4
10a
1a
1b
1c
1d
2
SH1
SH2
20-1
20-2
3
6
6a
10c

NOZZLE
TEST PATTERN (1200dpi)
TEST PATTERN SCANNED IMAGE (300dpi)
DENSITY
DENSITY DISTRIBUTION
PIXEL POSITION (PRIMARY SCANNING DIRECTION)
93
91
92
94
95
95
CORRECTION TARGET (EJECTION MALFUNCTION NOZZLE)
ADDITIONAL CORRECTION TARGET (IN HISTORY)
ADDITIONAL CORRECTION TARGET (IN HISTORY)
ADDITIONAL CORRECTION TARGET RANGE

IMAGE FORMING APPARATUS

CROSS-REFERENCE TO RELATED APPLICATIONS

This application relates to and claims priority rights from Japanese Patent Application No. 2023-042332, filed on Mar. 16, 2023, the entire disclosures of which are hereby incorporated by reference herein.

BACKGROUND

1. Field of the Present Disclosure

The present disclosure relates to an image forming apparatus.

2. Description of the Related Art

An inkjet image forming apparatus prints a test pattern on a print sheet using a recording head; on the basis of an image of the printed test pattern, detects an ejection malfunction nozzle that can not properly eject ink among nozzles that eject ink in the recording head; and increases an ink amount of an adjacent dot.

However, if a resolution of a scanned image of the test pattern is lower than a print resolution of the test pattern, then one pixel in the scanned image of the test pattern corresponds to plural nozzles (dots) and therefore when an ejection malfunction nozzle is detected, even if another ejection malfunction nozzle actually occurs in a periphery of the detected ejection malfunction nozzle, and consequently, since such another ejection malfunction nozzle is not detected, image quality degradation (blank line or the like) may occur due to ejection malfunction.

SUMMARY

An image forming apparatus according to an aspect of the present disclosure includes a recording head, a control unit, an ejection malfunction nozzle detecting unit, and a correction processing unit. The recording head is configured to eject ink corresponding to an image to be printed, using arranged nozzles. The control unit is configured to determine nozzles corresponding to the image to be printed and cause the recording head to eject ink from the nozzles. The ejection malfunction nozzle detecting unit is configured to (a) print a test pattern on a print sheet using the recording head, and (b) detect an ejection malfunction nozzle on the basis of a density distribution of a scanned image of the test pattern. The correction processing unit is configured to perform a correction process corresponding to the detected ejection malfunction nozzle. Here, a resolution of the scanned image is lower than a resolution of the test pattern printed on the print sheet using the recording head. Further, the correction processing unit (a) stores into a predetermined storage device history data that indicates the ejection malfunction nozzle for which the correction process was performed, (b) refers to the history data and detects as an additional correction nozzle a nozzle included in the history data as the ejection malfunction nozzle for which the correction process was performed, among nozzles corresponding to a predetermined pixel range that includes a pixel corresponding to the detected ejection malfunction nozzle, and (c) performs not only the correction process for the detected ejection malfunction nozzle but the correction process for the additional ejection malfunction nozzle.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
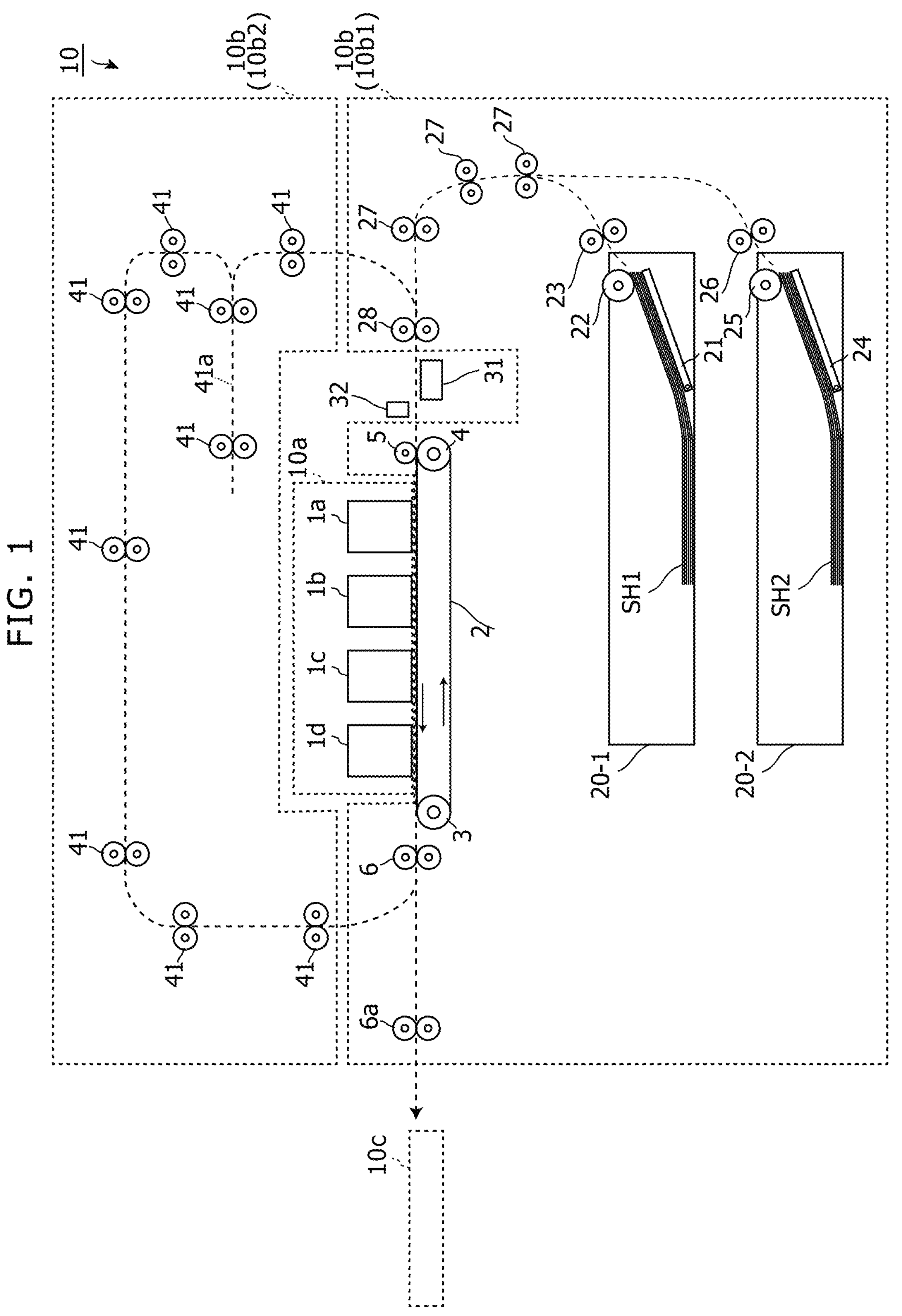
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10*a* and a sheet transportation unit 10*b*. The print engine 10*a* physically forms an image to be printed on a print sheet (print paper sheet or the like). In this embodiment, the print engine 10*a* is a line-type inkjet print engine. In this embodiment, the print engine 10*a* includes line-type head units 1*a* to 1*d* corresponding to four ink colors: Cyan, Magenta, Yellow, and Black.

Figure 2:
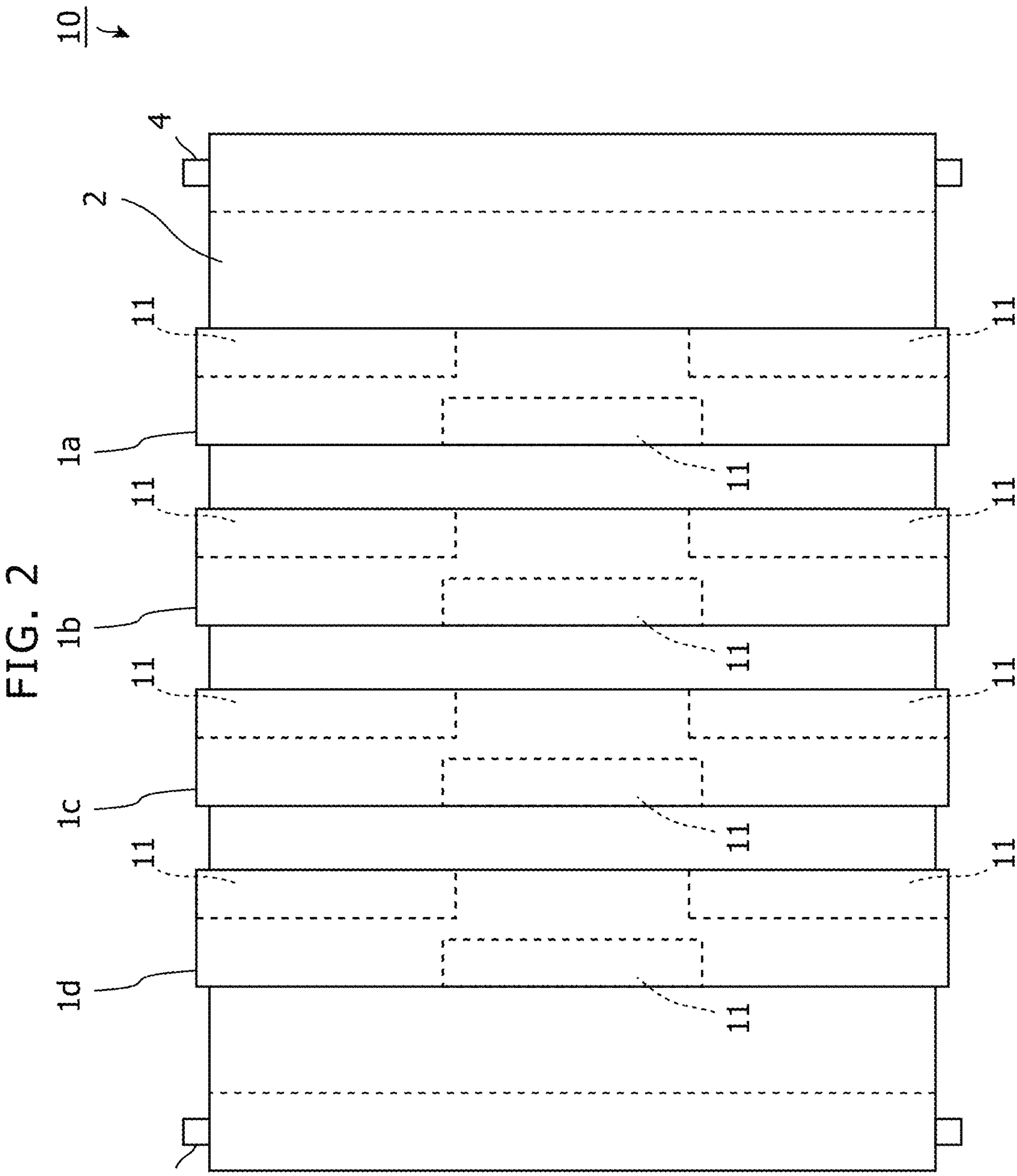
FIG. 2 shows a plane view of an example of recording heads 1*a* to 1*d* in the image forming apparatus 10 shown in FIG. 1.

FIG. 2 shows a plane view of an example of recording heads 1*a* to 1*d* in the image forming apparatus 10 shown in FIG. 1. As shown in FIG. 2, for example, in this embodiment, each of the inkjet recording units 1*a*, 1*b*, 1*c* and 1*d* includes plural (here, three) head units 11. The head units 11 are arranged along a primary scanning direction, and are capable of being mounted to and demounted from a main body of the image forming apparatus. Each of the inkjet recording units 1*a*, 1*b*, 1*c* and 1*d* may include only one head unit 11. The head unit 11 of the inkjet recording unit 1*a*, 1*b*, 1*c* or 1*d* includes 2-dimensionally arranged nozzles corresponding to ejection positions arranged in a primary scanning direction, and ejects ink corresponding to the image to be printed using the nozzles.

The sheet transportation unit 10*b* transports the print sheet to the print engine 10*a* along a predetermined transportation path, and transports the print sheet after printing from the print engine 10*a* to a predetermined output destination (here, an output tray 10*c* or the like).

The sheet transportation unit 10*b* includes a main sheet transportation unit 10*b*1 and a circulation sheet transportation unit 10*b*2. In duplex printing, the main sheet transportation unit 10*b*1 transports to the print engine 10*a* a print sheet to be used for printing of a first-surface page image, and the circulation sheet transportation unit 10*b*2 transports the print sheet from a posterior stage of the print engine 10*a* to a prior stage of the print engine 10*a* with detaining a predetermined number of print sheets.

In this embodiment, the main sheet transportation unit **10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a***.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units **1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c*** or the like.

Further, the main sheet transportation unit **10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2**.

When performing duplex printing, the circulation sheet transportation unit **10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a*** among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine **10*a***.

The sheet detecting sensor 32 is an optical sensor that detects that a front end of the print sheet SH1 or SH2 passes through a predetermined position on the transportation path. The line sensor 31 detects the positions of the both side end edges at a time point that the front end of the print sheet SH1 or SH2 is detected by the sheet detecting sensor 32.

For example, as shown in FIG. 1, the print engine **10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31** with changing an orientation of the print sheet in a switch back manner.

Figure 3:
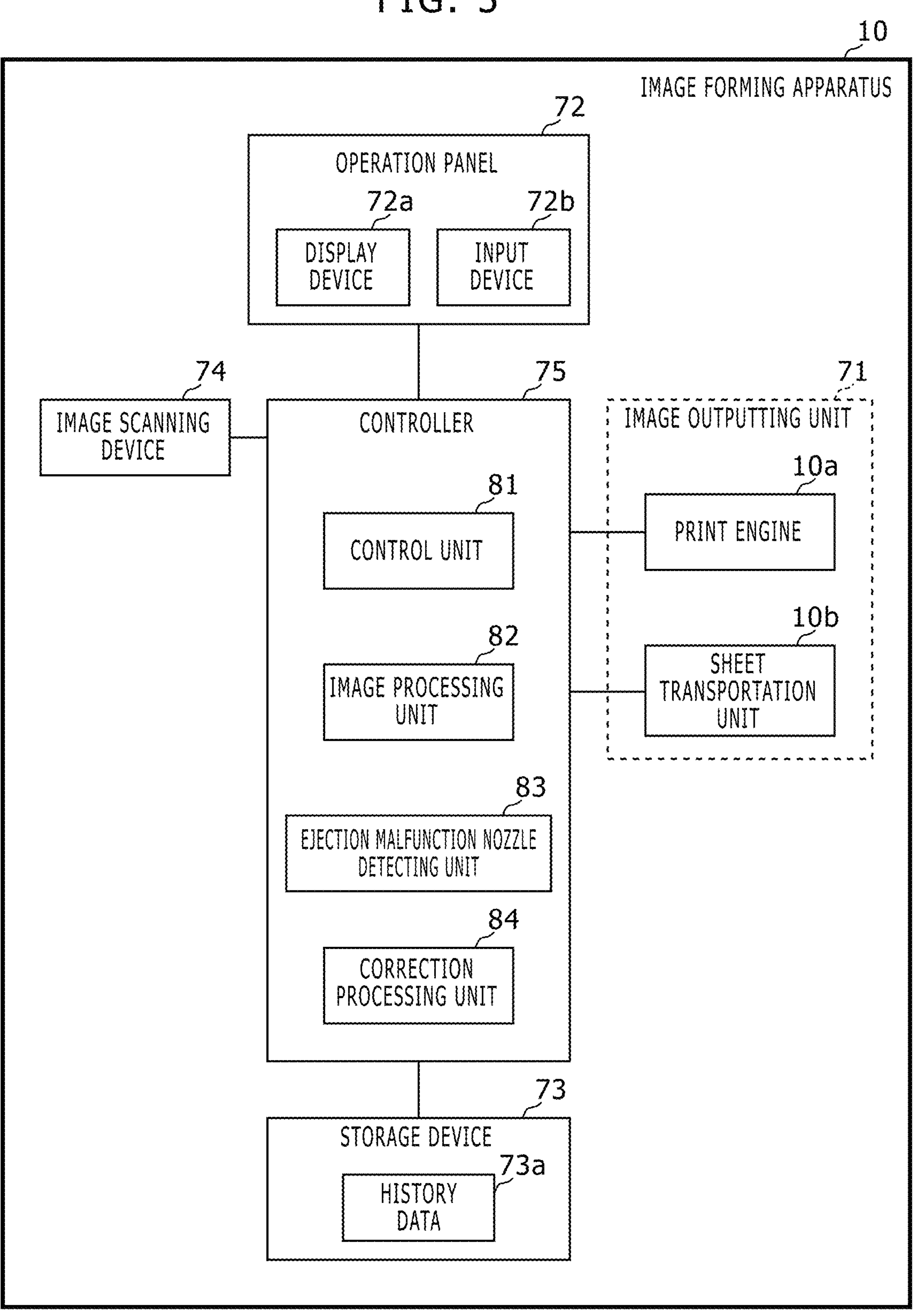
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device **72*a* such as a liquid crystal display and an input device 72*b* such as a hard key and/or touch panel, and displays sorts of messages for a user using the display device 72*a* and receives a user operation using the input device 72*b***.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, an ejection malfunction nozzle detecting unit 83, and a correction processing unit 84.

The control unit 81 controls the image outputting unit 71 (the print engine **10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82** performs a predetermined image process such as RIP (Raster Image Processing), color conversion, halftoning and/or the like for image data of a printing image.

Specifically, the control unit 81 causes the print engine **10*a*** to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process. Specifically, in the automatic centering function, the control unit 81 changes a depicting position of the image to be printed, in a primary scanning direction by a difference between a reference center position of the print engine **10*a* and the actual sheet center position. In this embodiment, because the nozzles of the recording heads 1***a* to 1*d* do not move, a nozzle corresponding to each pixel in the image to be printed is changed correspondingly to the depicting position of the image to be printed.

As mentioned, the control unit 81 determines nozzles corresponding to the image to be printed (i.e. a nozzle corresponding to each pixel) (here, correspondingly to a position of a print sheet), and causes the recording heads 1*a* to 1*d* to eject ink from the determined nozzles.

The ejection malfunction nozzle detecting unit 83 (a) prints a test pattern on a print sheet using the recording head 1*a*, 1*b*, 1*c* or 1*d*, and (b) detects an ejection malfunction nozzle on the basis of a density distribution of a scanned image of the test pattern. Further the ejection malfunction nozzle detecting unit 83 stores into the storage device 73 ejection malfunction nozzle data (nozzle number or the like) that indicates the detected ejection malfunction nozzle.

The test pattern is an existent one and for example a band-shaped image with a single density or an image including a thin line corresponding to each nozzle.

Further, a scanned image of the aforementioned test pattern is acquired using the line sensor 31 or the image scanning device 74. If the line sensor 31 scans an image of the test pattern, the print sheet on which the test pattern has been printed by the print engine 10*a* is transported to a position of the line sensor 31 using the circulation transportation unit 10*b*2.

Further, a resolution of the aforementioned scanned image (i.e. scan resolution) is lower than a resolution of the test pattern printed on the print sheet using the recording head 1*a*, 1*b*, 1*c* or 1*d* (i.e. print resolution). For example, the resolution of the aforementioned scanned image is set to be equal to or less than one quarter of the print resolution. For example, when the print resolution is 1200 dpi, the resolution of the aforementioned scanned image is 300 dpi.

When ejection malfunction occurs on a nozzle, a density defect appears in the test pattern. Therefore even in a density distribution of the scanned image, a density reduction appears at a density defect position in the test pattern. However the density reduction does not have a peak shape but gently changes because the resolution of the aforementioned scanned image is lower than the print resolution.

The ejection malfunction nozzle detecting unit 83 determines a pixel having a lowest density of the density reduction in the density distribution of the aforementioned scanned image, and determines as an ejection malfunction nozzle a nozzle corresponding to this pixel on the basis of a shape of the density reduction in the density distribution of the aforementioned scanned image.

It should be noted that a relationship between a pixel in the scanned image and a nozzle is determined on the basis of a ratio between the print resolution and the scan resolution using as a reference either a reference mark (thin line) at an end part of the scanned image or reference marks (thin lines) arranged with an interval of predetermined nozzles together with the test pattern. For example, if the reference is set as an end part of the scanned image, the i th pixel corresponds to nozzles of the nozzle numbers ($(i-1)\times R+1$) to ($i\times R$). Here, R is a ratio between the print resolution and the scan resolution.

The correction processing unit 84 performs a correction process (here, as a hardware process) corresponding to a correction target nozzle for an image to be printed. In this correction process, for example, image data (pixel value) of a pixel corresponding to an ejection malfunction nozzle is corrected to a value of non ink ejection, and image data (pixel value) of a pixel adjacent to the ejection malfunction nozzle is corrected such that a density of this pixel is increased.

Further, the correction processing unit 84 (a) stores into a predetermined storage device 73 history data 73*a* that indicates the ejection malfunction nozzle for which the correction process was performed, (b) refers to the history data 73*a* and detects as an additional correction nozzle a nozzle included in the history data as the ejection malfunction nozzle for which the correction process was performed, among nozzles corresponding to a predetermined pixel range that includes a pixel corresponding to the detected ejection malfunction nozzle, and (c) performs not only the correction process for the detected ejection malfunction nozzle but the correction process for the additional ejection malfunction nozzle.

This pixel range is a pixel corresponding to the ejection malfunction nozzle and two pixels adjacent to both sides of the pixel corresponding to the ejection malfunction nozzle (i.e. three pixels in total).

Figure 4:
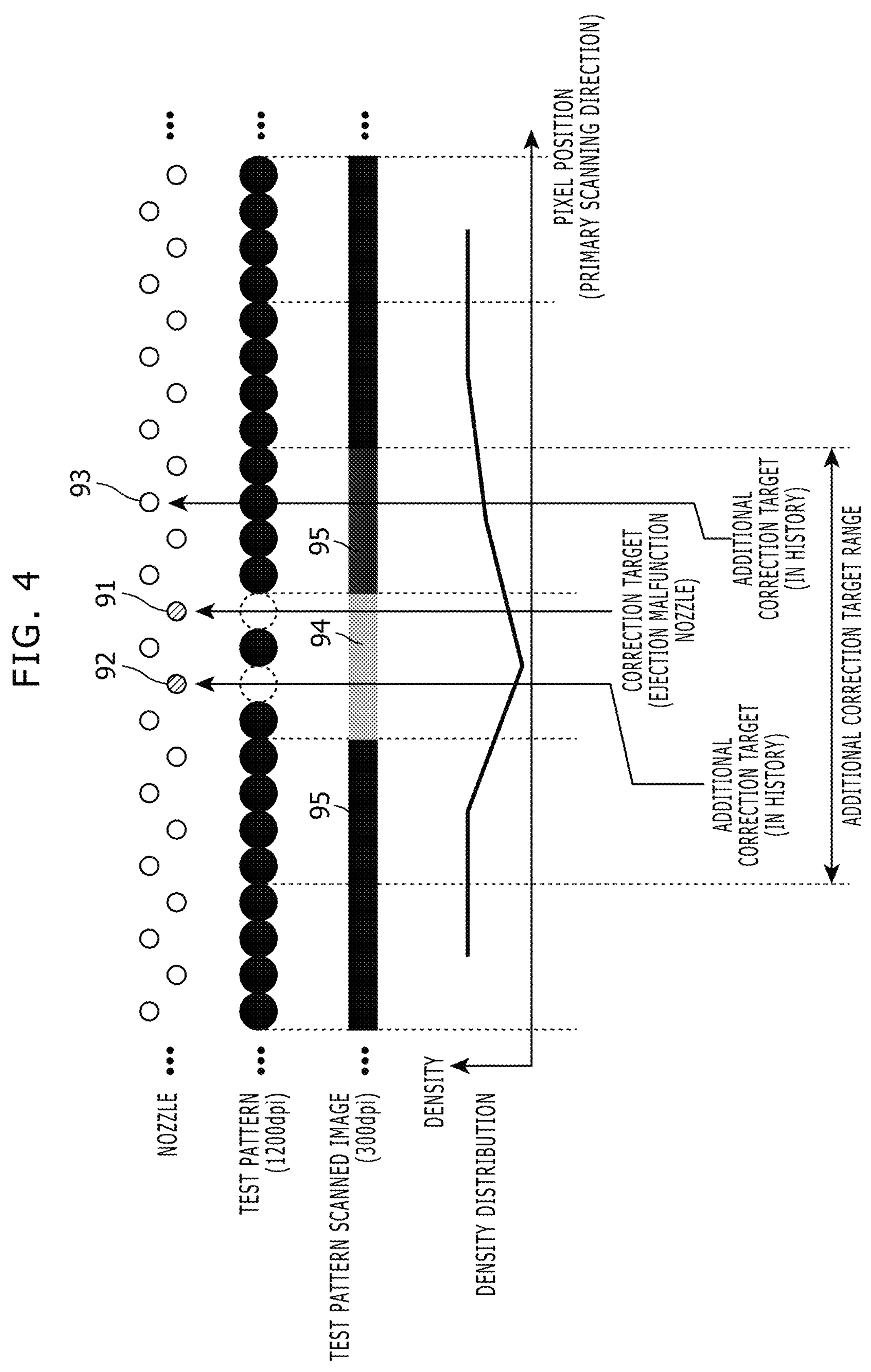
FIG. 4 shows a diagram that explains a behavior of a correction processing unit 84 shown in FIG. 3.

FIG. 4 shows a diagram that explains a behavior of a correction processing unit 84 shown in FIG. 3. As shown in FIG. 4, for example, if an ejection malfunction nozzle 91 is detected by the ejection malfunction nozzle detecting unit 83, the correction processing unit 84 determines as a pixel range a pixel 94 corresponding to the ejection malfunction nozzle 91 and adjacent pixels 95, and determines as additional nozzles nozzles 92 and 93 indicated by the history data 73*a* among nozzles corresponding to the pixel range.

Here, even if the nozzle 92 is not detected as an ejection malfunction nozzle but has ejection malfunction, the nozzle 92 is added to correction targets and the correction process is additionally performed for the nozzle 92. Meanwhile, although the nozzle 93 does not have ejection malfunction, the nozzle 93 is added to correction targets and the correction process is additionally performed for the nozzle 93.

A specific nozzle may tend to have ejection malfunction due to a structure of the recording head 1*a*, 1*b*, 1*c* or 1*d*, a cleaning method of the recording head 1*a*, 1*b*, 1*c* or 1*d*, or the like. Therefore, in this embodiment, a nozzle that was detected as a correction target in the past in a periphery of the detected ejection malfunction nozzle is detected as an additional correction nozzle because such nozzle may cause a density reduction part in the scanned image (i.e. such nozzle may have ejection malfunction) even though such nozzle is not detected as an ejection malfunction nozzle.

In this embodiment, the correction processing unit 84 deletes and resets the history data 73*a* when detecting one of events: cleaning of the recording head 1*a*, 1*b*, 1*c* or 1*d*, exchange of the recording head 1*a*, 1*b*, 1*c* or 1*d* and a specific manual operation (an operation to the input device 72*b* by a service person).

Further, the correction processing unit 84 may determine in accordance with a user operation to the input device 72*b* whether (a) the correction processing unit 84 performs not only the correction process for the detected ejection malfunction nozzle but the correction process for the additional ejection malfunction nozzle or (b) the correction processing unit 84 performs the correction process for the detected ejection malfunction nozzle without performing the correction process for the additional ejection malfunction nozzle.

The following part explains a behavior of the image forming apparatus 10.

(a) Setting of a Nozzle as a Target of the Correction Process

The ejection malfunction nozzle detecting unit 83 performs a detecting action of an ejection malfunction nozzle at a predetermined timing. In the detecting action of an ejection malfunction nozzle, the ejection malfunction nozzle detecting unit 83 firstly, using the control unit 81, causes the image outputting unit 71 to print the aforementioned test pattern with a predetermined print resolution on a print sheet, and acquires with a predetermined scan resolution a scanned image (RGB image data, grayscale image data or the like) of the test pattern printed on the print sheet.

Further, the ejection malfunction nozzle detecting unit 83 detects an ejection malfunction nozzle from a primary-scanning-directional density distribution of the scanned image of the test pattern, as mentioned. Upon the detection of the ejection malfunction nozzle, the ejection malfunction nozzle detecting unit 83 stores into the storage device 73 ejection malfunction nozzle data (identification information such as nozzle number) of the determined ejection malfunction nozzle. Thus, the ejection malfunction nozzle data is renewed with identification information of the nozzle determined as a correction target at this time. Further, the correction processing unit 84 determines whether an additional correction nozzle to the detected ejection malfunction nozzle exists or not on the basis of the history data 73*a*; and if an additional correction nozzle adds the additional correction nozzle as a correction target to the ejection malfunction nozzle data. Further, the correction processing unit 84 adds to the history data 73*a* the nozzles (the detected ejection malfunction nozzle and the additional correction nozzle) determined as correction targets.

As mentioned, nozzles as correction targets are set in the ejection malfunction nozzle data.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this process, the correction processing unit 84 reads the ejection malfunction nozzle data from the storage device 73 and determines an ejection malfunction nozzle before starting the printing; and upon detecting a position of a print sheet using the line sensor 31, (a) determines a nozzle corresponding to each pixel in the aforementioned image, (b) determines correction target nozzles used for the aforementioned image, and (c) performs the correction process for the correction target nozzles. Consequently, in this image, the correction process is performed for a part corresponding to the correction target nozzles (and adjacent nozzles in the primary scanning direction to the ejection malfunction nozzle). Subsequently, the control unit 81 performs the aforementioned printing on the basis of the image data after the correction process.

As mentioned, in the aforementioned embodiment, the ejection malfunction nozzle detecting unit 83 detects an ejection malfunction nozzle on the basis of a density distribution of a scanned image of a test pattern. The correction processing unit 84 performs a correction process corresponding to the detected ejection malfunction nozzle. Here, a resolution of the aforementioned scanned image is lower than a resolution of the test pattern printed on the print sheet using the recording head. Further, the correction processing unit 84 (a) stores into a predetermined storage device 73 history data 73*a* that indicates the ejection malfunction nozzle for which the correction process was performed, (b) refers to the history data 73*a* and detects as an additional correction nozzle a nozzle included in the history data as the ejection malfunction nozzle for which the correction process was performed, among nozzles corresponding to a predetermined pixel range that includes a pixel corresponding to the detected ejection malfunction nozzle, and (c) performs not only the correction process for the detected ejection malfunction nozzle but the correction process for the additional ejection malfunction nozzle.

Consequently, even when a resolution of the scanned image of the test pattern is lower than a print resolution of the test pattern, image quality degradation due to another ejection malfunction nozzle adjacent to the detected ejection malfunction nozzle is restrained.

As an example, determination of correction target nozzles was performed in a case that the print resolution is 1200 dpi, the scan resolution is 300 dpi, a width of the test pattern is about 106 mm (5000 nozzles), and the pixel range is set as the aforementioned three pixels (i.e. 12 nozzles). The result indicates three blank lines are visually identified in a band image of 50-percent density. Contrarily, in a case that the correction is not performed for the additional correction nozzles, 25 blank lines are visually identified. Thus, the correction for the additional correction nozzle as mentioned results in high printing image quality.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the additional correction nozzle is included in the history data 73*a*. Alternatively, the additional correction nozzle may not be included in the history data 73*a*.

Further, in the aforementioned embodiment, for each nozzle indicated in the history data 73*a*, a timing (date and time or the like) when the nozzle is included in the history data 73*a*) may be included in the history data 73*a*, and a nozzle that a predetermined time elapses from the timing may be deleted from the history data 73*a*.

What is claimed is:

1. An image forming apparatus, comprising:

a recording head configured to eject ink corresponding to an image to be printed, using arranged nozzles;

a control unit configured to determine nozzles corresponding to the image to be printed and cause the recording head to eject ink from the nozzles;

an ejection malfunction nozzle detecting unit configured to (a) print a test pattern on a print sheet using the recording head, and (b) detect an ejection malfunction nozzle on the basis of a density distribution of a scanned image of the test pattern; and a correction processing unit configured to perform a correction process corresponding to the detected ejection malfunction nozzle;

wherein a resolution of the scanned image is lower than a resolution of the test pattern printed on the print sheet using the recording head; and the correction processing unit (a) stores into a predetermined storage device history data that indicates the ejection malfunction nozzle for which the correction process was performed, (b) refers to the history data and detects as an additional correction nozzle a nozzle included in the history data as the ejection malfunction nozzle for which the correction process was performed, among nozzles corresponding to a predetermined pixel range that includes a pixel corresponding to the detected ejection malfunction nozzle, and (c) performs not only the correction process for the detected ejection malfunction nozzle but the correction process for the additional ejection malfunction nozzle.

2. The image forming apparatus according to claim 1, wherein the pixel range is a pixel corresponding to the detected ejection malfunction nozzle and pixels adjacent to the pixel corresponding to the detected ejection malfunction.

3. The image forming apparatus according to claim 1, wherein the correction processing unit deletes and resets the history data when detecting one of events: cleaning of the recording head, exchange of the recording head and a specific manual operation.

4. The image forming apparatus according to claim 1, wherein the correction processing unit determines in accordance with a user operation whether (a) the correction processing unit performs not only the correction process for the detected ejection malfunction nozzle but the correction process for the additional ejection malfunction nozzle or (b) the correction processing unit performs the correction process for the detected ejection malfunction nozzle without performing the correction process for the additional ejection malfunction nozzle.

* * * * *